May 23, 1950 F. LÄNG 2,508,613

ARRANGEMENT FOR RADIO-TELEPHONE TRAFFIC THROUGH EXCHANGE BETWEEN MOBILE STATIONS AND BETWEEN SUCH STATIONS AND A TELEPHONE NETWORK

Filed March 16, 1948

Inventor
Fritz Lang
By Robert E. Burns
Attorney

SEARCH ROO

Patented May 23, 1950

2,508,613

UNITED STATES PATENT OFFICE 2,508,613

ARRANGEMENT FOR RADIO-TELEPHONE TRAFFIC THROUGH EXCHANGE BETWEEN MOBILE STATIONS AND BETWEEN SUCH STATIONS AND A TELEPHONE NETWORK

Fritz Läng, Solothurn, Switzerland, assignor to Autophon Aktiengesellschaft, Solothurn, Switzerland Application March 16, 1948, Serial No. 15,216
In Switzerland March 19, 1947

3 Claims. (Cl. 250—6)

Figures 1, 2:
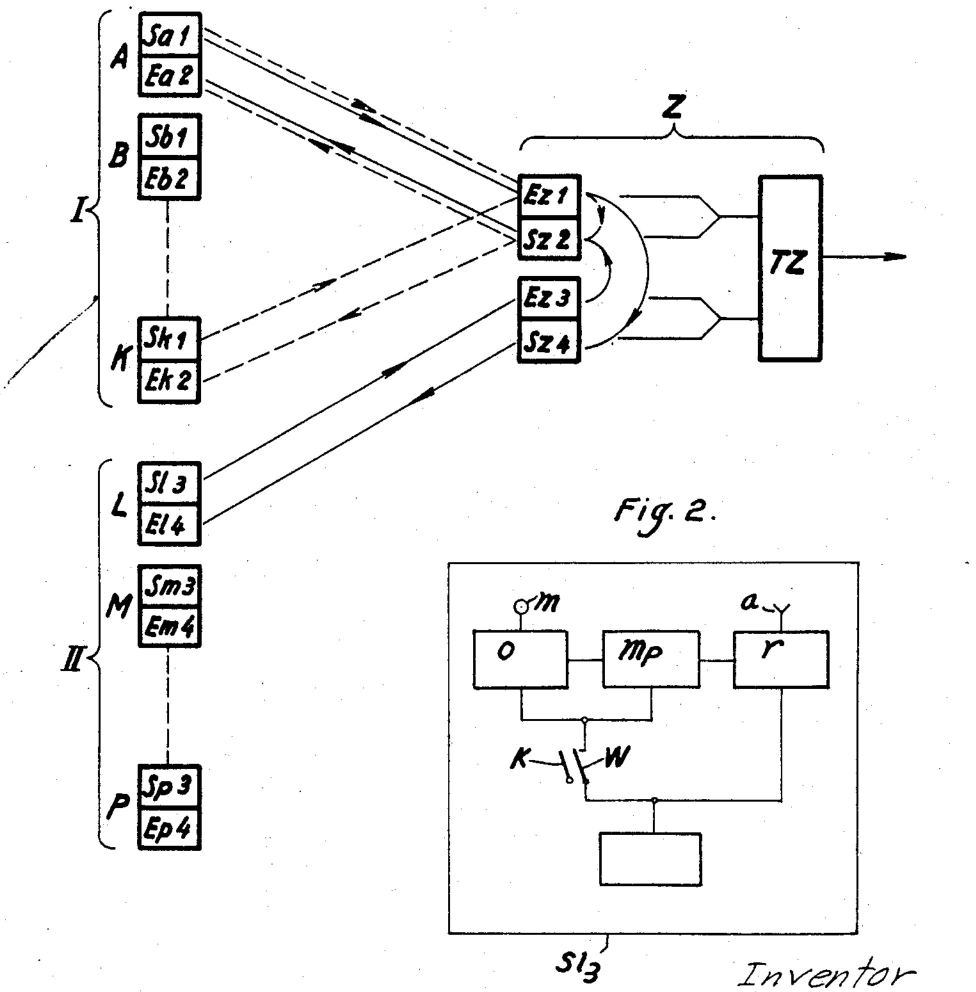

In order to enable radio-telephone communication between mobile stations and a stationary station, each mobile station and the stationary station are provided with a transmitter and a receiver. Transmitter and receiver of a station may operate on the same or on different wave-lengths. In the case of the same wave-length, only alternate two-way traffic is possible between two stations, i. e. the transmitter and the receiver operate alternately, the switching over to transmission or to reception has to be effected in both co-operating stations. Automatic traffic through a telephone network, for example, is then not possible.

For every direct automatic traffic, two different wave-lengths for the transmitter and the receiver are necessary. In the case of a group of mobile stations which all possess the same pair of wave-lengths and which have to be all in communication with a stationary station, such communication with the stationary station is possible by way of two-way or duplex traffic. In the case of two-way traffic the switch-over to the transmitter or to the receiver is effected in the mobile stations which possess for this purpose a switching organ. The stationary station may, in this case, also serve as a relay station for traffic between two mobile stations. Duplex traffic is only possible between a mobile and a stationary station, the stationary station being however able to work through a telephone network.

Should duplex traffic be possible between mobile stations, the two mobile stations have to operate on two pairs of different wave-lengths and a transmitter-receiver pair corresponds in the stationary station to each mobile station. If an installation comprises many mobile stations, they are advantageously divided into groups, each group operating on a fixed pair of wave-lengths, a pair of transmitters and receivers being attributed in the stationary station to each group. In such an arrangement only two mobile stations of different groups may communicate with each other over the stationary station, the traffic being of the duplex type, which is more convenient and more simple than alternate two-way traffic. But this arrangement possesses, however, the disadvantage that mobile stations of the same group are unable to communicate with one another.

The object of the present invention is to enable an all-round traffic between mobile stations over a stationary station as a relay, as well as between the mobile stations and the subscribers of a network. It relates to an arrangement for radio-telephone traffic over an exchange, the mobile stations each comprising a radio transmitter and receiver with different fixed wave-lengths, such stations being divided into groups to each group being allocated a pair of wave-lengths as well as a transmitter and a receiver in the exchange, and the arrangement is characterised in that the exchange, the receiver and the transmitter are interconnected and connected to the automatic exchange in such a manner as to enable a two-way traffic between mobile stations of the same group and a duplex traffic between mobile stations of different groups, as well as between mobile stations and stations of the telephone network. In case of two-way traffic the receivers remain permanently in operation and only the transmitter of a mobile station is being cut-off during listening to a cooperating station. In order to enable this, each mobile station comprises a switching organ. The exchange possesses, apart from the transmitter and receiver pairs attributed to each group, an automatic telephone exchange and traffic transmission between the mobile stations or between mobile stations and the network may be effected automatically in the exchange.

The invention is described by way of example with reference to the accompanying drawing, wherein Fig. 1 is a diagrammatic view of the radio-telephone arrangement of the invention, and Fig. 2 is a diagrammatic view in greater detail of one of the transmitter stations. The drawing illustrates mobile stations subdivided into groups, the exchange with the transmitters and receivers and the various possibilities of communication. The subscriber groups of the mobile stations are designated by I and II. Group I comprises subscribers A, B . . . K. Group II comprises subscribers L, M . . . P. Each station comprises a transmitter S and a receiver E and in each group I the wave-length 1 is attributed to each transmitter and the wave-length 2 to each receiver, in group II the wave-length 3 is attributed to each transmitter, and the wave-length 4 to each receiver. The mobile subscribers being subdivided into two groups, the exchange comprises two transmitters and two receivers, more particularly receiver $E_{z1}$ with wave-length 1 and the transmitter $S_{z2}$ with wave-length 2 for group I and receiver $E_{z3}$ with wave-length 3 and a transmitter $S_{z4}$ with wave-length 4 for group II. Apart from that, the exchange Z comprises an automatic exchange of a standard telephone network, with which the mobile stations may communicate.

The traffic between the stations is effected as follows: should the mobile subscriber A, for example, wish to communicate with the mobile subscriber L, then the transmitter $S_{a1}$ cooperates with the receiver $E_{z1}$ in the exchange, this receiver being connected to the transmitter $S_{z4}$ cooperating with the receiver $E_{l4}$ of the mobile station L. Also, the transmitter $S_{l3}$ cooperates with the receiver $E_{z3}$ which is connected to the transmitter $S_{z2}$ cooperating with the receiver $E_{a2}$ of the station A. The traffic is of the duplex transmission type. The connection of the transmitters and of the receivers in the exchange may be effected either manually or automatically. In the present example, the installation comprises two subscriber groups. It is clear that the installation may comprise any number of groups and that there is a number of transmitter and receiver pairs in the exchange equal to the number of subscriber groups. If the mobile subscriber A wishes to communicate with a station of the telephone network, the receiver $E_{z1}$ and the transmitter $S_{z2}$, with which the mobile subscriber A cooperates, are switched in the exchange over a forked connection to the automatic exchange TZ of the telephone network in which the connection with the required subscriber is established. If the mobile subscriber A wishes, for example, to communicate with the mobile subscriber B, who belongs to the same group, the transmitter $S_{a1}$ cooperates with the receiver $E_{z1}$ which is connected to the transmitter $S_{z2}$ cooperating with the receiver $E_{b2}$. Now, the traffic is of the two-way type, because when the transmitter $S_{a1}$ cooperates with the transmitter $S_{z2}$ over the receiver $E_{z1}$, the transmitter $S_{b1}$ which also may cooperate with the receiver $E_{z1}$ should be inoperative in order to guarantee the reception of station $S_{a1}$. If the station B wishes to reply, then the transmitter $S_{b1}$ cooperates with receiver $E_{z1}$ and the latter cooperates with the receiver $E_{a2}$ over the transmitter $S_{z2}$. The transmitter $S_{a1}$ has then to be cut off, in order to guarantee the reception of station $S_{b1}$ by the receiver $E_{z1}$.

If such an installation comprises many mobile subscribers and several groups, the frequency of communications between two stations of the same group is small, thus the cumbersome two-way traffic between such stations is not of much importance. On the other hand, such an installation enables a duplex traffic between each mobile subscriber and all other mobile stations. The connected subscribers are not in a position to know forthwith whether duplex traffic between two mobile stations is possible or two-way traffic is necessary. It is possible, for example, to attribute to the subscriber groups reference numbers which precede the subscriber numbers, in such a manner that the subscribers are notified whether they communicate with a subscriber of the same or of another group. Practically, duplex traffic is effected in most cases and no further measures are necessary for controlling the direction of the communication. In case of a connection within a group the subscriber notices when listening to the cooperating station whether he is able to receive such station, or the exchange is being reached by its own transmitter, the corresponding subscriber then cutting off its own transmitter when listening to the cooperating station, which produces a faultless reception of the cooperating station. The own transmitter has always to be cut-in when speaking.

Such a cut-in or cut-off of the own transmitter may be effected, for example, if the microtelephone of the subscriber station comprises a communication key with a working contact for cutting-in its own transmitter, which contact has to be closed at least when speaking. Fig. 2 shows such a working contact *w* in connection with the transmitter of a mobile station, for example the transmitter $S_{l3}$. This transmitter comprises a high-frequency element *h* to which is connected the microphone *m* and the antenna *a*, and the power supply *p* which may be connected to the high-frequency element *h* through the working contact *w*. The conversation key *k* is mechanically connected to the working contact *w*. When the conversation key *k* is operated by the subscriber, the movement of the conversation key *k* is transferred to the working contact *w*, so that the connection between power supply and the high-frequency element is established, whereby the transmitting condition of the transmitter is established. If duplex transmission is possible, the contact may remain closed, also when listening, i. e. through the whole duration of the communication. In case of two-way traffic, the reception of the cooperating station by the subscriber will be unsatisfactory or not possible at all and the key will have to be released, which makes the own transmitter inoperative and reception of the cooperating station being made possible. But the installation may also be such that instead of a microtelephone key a communication key with an idle contact is provided, over which the own transmitter of the station is permanently cut-in during a communication. In the case of two-way traffic, and if the reception of the cooperating station by the subscriber is unsatisfactory or impossible, he may, when listening, cut-off by means of this switch its own transmitter and cut it in again when speaking. In the case of duplex traffic this switch has not to be operated.

What I claim is:

1. In an arrangement for radio-telephone traffic, mobile stations arranged in groups, an exchange and a telephone network for establishing two-way traffic between the mobile stations of the same group, as well as a simultaneous two-way traffic connection between the mobile stations of different groups, as well as between the mobile stations and the stations of the telephone network, said mobile stations comprising each a transmitter and a receiver, to each of said transmitter and receiver being attributed a transmitting and receiving wavelength respectively, the transmitting and receiving wavelengths of a mobile station being different, but all transmitting wavelengths in themselves and all receiving wavelengths in themselves being equal within the same group, but different in different groups, and in each exchange one each a transmitter and a receiver for each group, said transmitter and receiver of the exchange being interconnected and connected with said telephone network.

2. In an arrangement according to claim 1, microtelephones in said mobile stations, in said microtelephones one each a conversation key and a working contact for cutting-in the associated transmitter during two-way traffic.

3. In an arrangement according to claim 1, a conversation key with an idle contact for permanent cut-in of the transmitter of a mobile station during simultaneous two-way traffic and for cutting-out the said transmitter when listening to the cooperating station in alternate two-way traffic.

FRITZ LÄNG.

REFERENCES CITED

The following references are of record in the file of this patent:

UNITED STATES PATENTS

| Number | Name | Date |
|---|---|---|
| 2,061,699 | Fox | Nov. 24, 1936 |
| 2,064,906 | Green et al. | Dec. 22, 1936 |
| 2,064,961 | Tidd | Dec. 22, 1936 |
| 2,101,668 | Bishop et al. | Dec. 7, 1938 |
| 2,129,332 | Mastini | Sept. 6, 1938 |
| 2,164,301 | Knotts | Feb. 7, 1939 |
| 2,292,222 | Haigis | Aug. 4, 1942 |
| 2,401,759 | Hersey | June 11, 1946 |
| 2,421,017 | Deloraine | May 27, 1947 |